Jan. 29, 1957  H. TENER  2,779,337
VACUUM HUSKING ROLL FOR MECHANICAL CORN PICKERS
Filed June 21, 1954
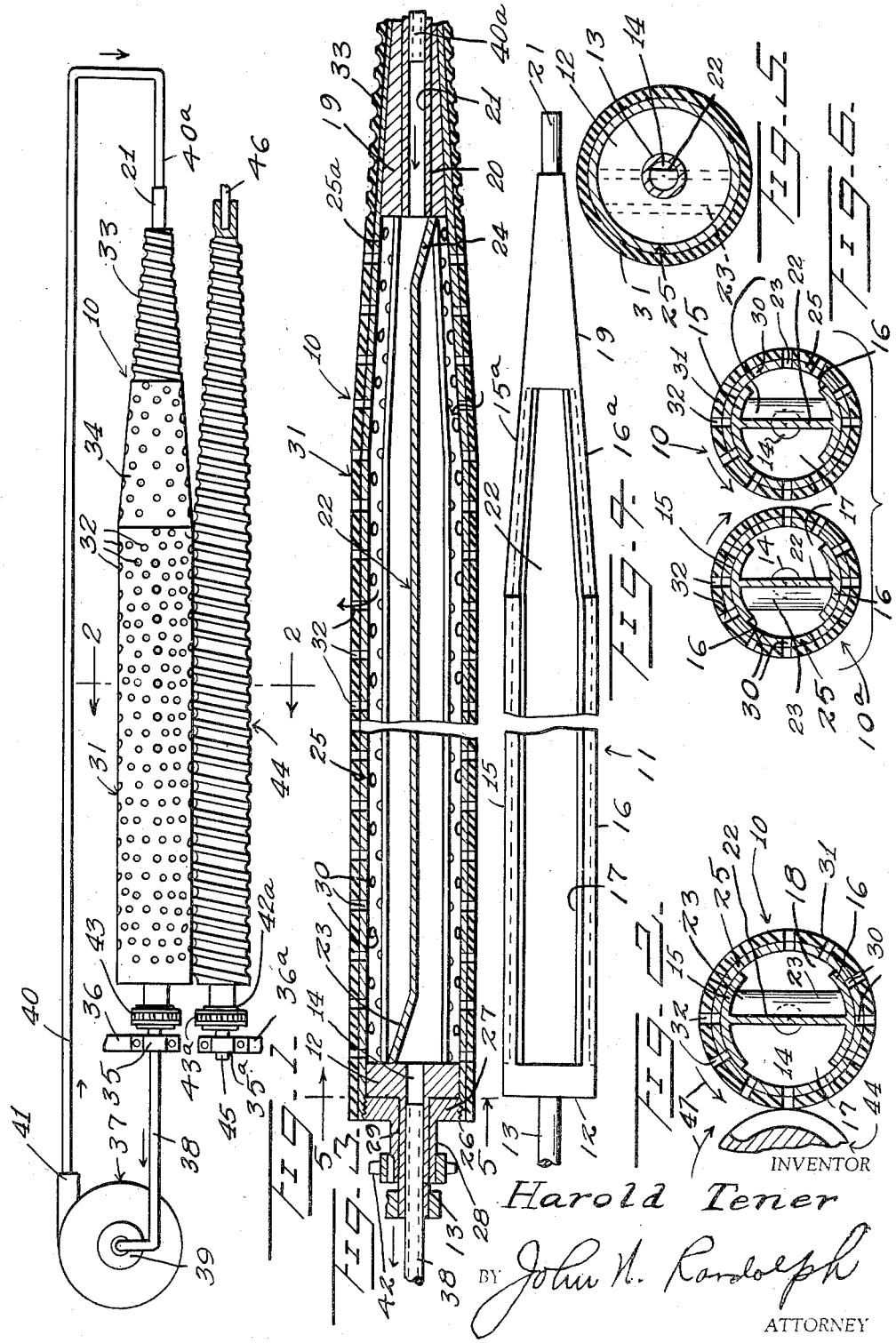
INVENTOR
Harold Tener
BY John N. Randolph
ATTORNEY

United States Patent Office 2,779,337
Patented Jan. 29, 1957

2,779,337

VACUUM HUSKING ROLL FOR MECHANICAL CORN PICKERS

Harold Tener, Cory, Ind.

Application June 21, 1954, Serial No. 438,118

6 Claims. (Cl. 130—5)

This invention relates to an improvement in mechanical corn pickers and more particularly to a novel vacuum husking roll for creating a suction between and in the vicinity of a pair of husking rolls which are revolving in opposite directions and only in the area near the adjacent portions of said rolls for pulling corn stalks downwardly between the rolls.

Another object of the invention is to provide a novel vacuum husking roll from which air under pressure will be discharged from the peripheral portion of the roll located remote from the other roll of the pair of rolls for thus cleaning the vacuum husking roll of husks, stalks and other debris or foreign matter which might adhere or cling thereto.

Still a further object of the invention is to provide a mechanical corn picker which will accomplish a much cleaner husking operation even in the driest of weather and which will eliminate the need for using extra husking rolls or other attachments to husking rolls such as are now commonly employed for husking corn under dry weather conditions.

A further object of the invention is to provide a vacuum husking roll of substantially increased tenacity and which is so constructed that the shock exerted against the roll by engagement of the corn stalks and ears therewith will be substantially diminished, to thereby minimize the risk of breakage or damage to the roll.

Still another object of the invention is to provide an improved vacuum husking roll which will substantially reduce the possibility of mutilation or serious injury to the hand of the operator if caught between a pair of the revolving rolls.

Various other objects and advantages of the invention will hereinafter become more fully apparent from the following description of the drawing, illustrating a presently preferred embodiment thereof, and wherein:

Figure 1 is a top plan view, partially in section, showing a pair of husking rolls including one of the improved vacuum type rolls and showing the vacuum and blower system thereof;

Figure 2 is an enlarged fragmentary cross sectional view taken substantially along a plane as indicated by the line 2—2 of Figure 1;

Figure 3 is an enlarged longitudinal horizontal sectional view, partly broken away, through the vacuum husking roll;

Figure 4 is a fragmentary side elevational view of the core of the vacuum husking roll;

Figure 5 is a cross sectional view of the vacuum husking roll, taken substantially along a plane as indicated by the line 5—5 of Figure 3, and Figure 6 is a cross sectional view taken substantially along a plane corresponding to the plane of Figure 2 and showing a pair of identical vacuum husking rolls utilized in combination.

Referring more specifically to the drawing, the vacuum husking roll in its entirety and comprising the invention is designated generally 10 and includes a core, designated generally 11, which is best illustrated in Figure 4. The core 11 is formed of a rigid metal and includes a relatively thick disk 12 having an axially disposed tubular stem 13 projecting from an outer side thereof, a continuation of the bore 14 of which extends through the disk 12, as seen in Figure 3. The parts 12 and 13 constitute the rear end of the core 11. The core 11 also includes longitudinally extending oppositely disposed cylinder segments 15 and 16, constituting integral extensions of the disk 12 and which project forwardly therefrom away from the stem 13. The cylinder segments 15 in cross section each define an arc of approximately 90°, so that the spaces 17 and 18 between the complementary longitudinal edges of the segments 15 and 16 each defines an opening of approximately 90°. However, as the description proceeds it will become apparent that the circumferential width of the segments 15 and 16 and of said openings 17 and 18 may vary. The cylinder segments 15 and 16 at their opposite, forward ends, merge with the enlarged rear end of a tapered or frusto-conical core portion 19 with which the forward ends of the segments 15 and 16 are integrally formed. Likewise, the cylinder segments 15 and 16 include converging forward end portions 15a and 16a the outer surfaces of which are disposed in alignment with portions of the periphery of the core end 19 with which said segment portions 15a and 16a join. The forward core portion 19 is provided with an axial bore 20 of substantially smaller diameter than the external diameter of the enlarged rear end of the core portion 19. A rigid pipe or tube 21 extends through and is secured in the bore 20 and has a forward end extending a short distance beyond the forward end of said core portion 19, as best seen in Figure 4. The core 11 also includes an elongated divider strip 22, which extends between the disk 12 and the core 19, which has an upper edge suitably secured to or formed integral with the inner side of the top segment 15 and a bottom edge similarly connected to the inner side of the bottom segment 16. The end portions 23 and 24 of the divider 22, which join with the disk 12 and core portion 19, respectively, are flared in opposite directions, as best seen in Figure 3, so that the end 23 joins the disk 12 on one side of the bore 14 and the end 24 joins the core portion 19 on the opposite side of the bore of the tube 21, for a purpose which will hereinafter become apparent.

A cylinder 25 has a relatively close fitting engagement around the core 11 on which it is mounted for rotation relatively to said core and includes a tapered forward end 25a which fits around the converging segment portions 15a and 16a and around the core portion 19. The cylinder 25 is applied to the core 11 over its tapered forward end with the enlarged end of the cylinder as its leading end is moved rearwardly to a fully applied position as illustrated in Figures 1 and 3. The rear end of the cylinder 25 is internally threaded as seen at 26 to receive an externally threaded hub 27 having a sleeve portion 28 projecting from one side thereof, the bore 29 of which extends axially through the hub 27 and is sized to fit turnably on the stem 13. The threaded cylinder end 26 extends to beyond the disk 12, and the hub 27, which is threaded into said end 26, abuts or substantially abuts the outer side of the disk 12 around the stem 13. The cylinder 25 is perforated longitudinally and circumferentially as seen at 30 from adjacent its threaded end 26 down to adjacent the portion thereof which turnably engages on the core portion 19. The cylinder 25 including the portion 25a thereof, is preferably enclosed in a casing 31 which is preferably formed of a relatively hard rubber and which is suitably bonded thereto. The rubber casing 31 is provided with perforations 32 registering with the cylinder perforations 30. The forward end of the covering 31, which is disposed around the core portion 19, is not provided with perforations but is spirally grooved to define a spirally ribbed and grooved forward end 33. The perforated portion of the covering 32 includes a rear tapered portion 34 thereof which is disposed around the core segment sections 15a and 16a.

The rear end of the hollow stem 13 extends beyond the rear end of the sleeve 28 and is secured by a clamp 35 to a suitable supporting member of a corn picker, a part of which is shown at 36, to support the core 11 immovably relatively to said corn picker part 36. A conventional blower 37 is suitably supported by means, not shown, on the corn picker behind the vacuum roll 10 and is suitably driven by any suitable power source, not shown. A rigid pipe or tube 38 has one end extending into and secured in the bore 14 of the stem 13 and the opposite end of said tube or pipe 38 communicates with the blower 37 through its inlet 39. A pipe 40 has one end fixed to the outlet 41 of the blower 37 and extends therefrom longitudinally of the husking roll 10 to beyond its forward end and is laterally spaced relatively to an outer portion of said roll 10. The pipe 40 has a turned back opposite end 40a which extends into the bore of the tube 21 and fits snugly therein. The pipe 40 is of sufficiently rigid construction to support the forward end of the roll 10.

A sprocket wheel 42 is fixed to the sleeve 28 between the hub 27 and clamp 35 and has an endless sprocket chain 43 trained thereover by means of which the cylinder 25 is revolved on the core 11. The sprocket chain 43 may be connected to any suitable source of power.

As illustrated in Figures 1 and 2, a conventional spirally ribbed corn picker or husking roll 44 is disposed along side the husking roll 10 for cooperation therewith and is supported at its rear end on another corn picker part 36a and has a stem portion 45 which is journaled in a bearing 35a, which is mounted on said part 36a. The husking roll 44 is driven by a sprocket wheel 42a and a chain 43a, which parts are located in substantially transverse alignment with the sprocket wheel 42 and chain 43. The forward end of the corn picking roll 44 is journaled on a fixedly mounted stem or shaft 46 which may be supported by the corn picker in any suitable manner. The chains 43 and 43a are driven in opposite directions for driving the rolls 10 and 44 in opposite directions and so that the adjacent portions of said rolls will travel downwardly, as illustrated by the arrows 47 in Figure 2, as is conventional with husking rolls.

Assuming that the rolls 10 and 44 are being thus driven, as said rolls are moved forwardly or from left to right as seen in Figure 1, corn stalks will be drawn downwardly between the downwardly traveling adjacent portions of the rolls 10 and 44 for snapping the ears of corn from the corn stalks, not shown. It will be understood that the rolls 10 and 44 will be inclined downwardly toward their forward ends, as is conventional in corn pickers. It will also be apparent that the sprocket wheel 42 and chain 43 will cause the cylinder 25 together with its covering 31 to revolve with the hub 27 around the core 11 and relatively to the pipes or tubes 38 and 40. The threaded connection of the hub 27 to the threaded cylinder end 26 is such that rotation of the hub 27 to cause rotation of the cylinder 25 in the direction as indicated by the arrow 47, will tend to tighten the threaded connection of the hub and cylinder. However, the threaded portion 26 is only of sufficient length to receive the hub 27 so that said hub will not be advanced into binding engagement with the disk 12.

Simultaneously with the rotation of the cylinder 25, the blower 37 is actuated to cause air to be expelled from the casing thereof through the outlet 41 and through the pipe 40 connected thereto. Air under pressure is discharged from the pipe end 40a into the bore of the tube 21 and into the outer half of the core 11 toward which it is deflected by the end 24 of the divider 22. The divider 22 prevents the air entering the core through the tube 21 from reaching the inner side of said core so that the air is disposed between the divider 22 and the opening 18 in the outer side of the core. The air thus entering the core under pressure through its forward end is discharged through the aligned perforations 30 and 32 while said perforations are in registration with the core opening 18 for dislodging husks, stalks and other debris or foreign matter which may be clinging to the covering 31.

At the same time, the aligned perforations 30 and 32 of the cylinder 25 and covering 31 which are in registration with the inner core opening 17 and disposed adjacent the other husking roll 44, as illustrated in Figure 2, will provide inlet openings through which air will be drawn inwardly by suction from the inlet 39 of the blower. The air thus entering the inner half of the core 11 will be prevented from reaching the outer half of said core by the divider 22 and will be drawn rearwardly and into the bore 14, which is in communication with said inner half of the core, due to the outwardly flared disposition of the divider end 23, as seen in Figures 1 and 2. In this manner air will be supplied to the blower 37 to be subsequently discharged through the pipe 40 and the air thus entering through the part of the cylinder 25 and its covering 31, which is traveling adjacent the roll 44, will produce a suction between the adjacent portions of the husking rolls 10 and 44 for pulling the corn husks downwardly between said rolls. In this manner a much cleaner job of husking will be accomplished even in the driest weather and the need for adding extra husking rolls or other attachments on the peripheries of the husking rolls for accomplishing a husking operation under dry conditions will be eliminated.

The relatively hard casing or coating 31 will increase the tenacity of the cylinder 25 and will lessen the shock against the roll as the ears of corn are drawn downwardly into the space between the rolls, thus minimizing the possibility of damage or breakage to the rolls.

A single roll 10 of the vacuum type is illustrated in Figures 1 and 2 in conjunction with a conventional roll 44 and will effectively function in such a combination to accomplish the aforedescribed results. If desired and for even more efficient operation, a second vacuum type husking roll 10a can be substituted for the husking roll 44, as illustrated in Figure 6. The roll 10a can be identical in construction to the roll 10 and will be equipped with a blower 37 and pipes 38 and 40, not shown. Obviously, the pipe 40 of the husking roll 10a will also be disposed on the outer side of said husking roll so that the two husking rolls will be disposed for rotation between the two air supply pipes 40. Air will then be drawn inwardly through the adjacently traveling portions of the cylinders and casings of the two husking rolls and will be expelled from said cylinders and casings through the remotely traveling portions thereof, all in the same manner and for the same purpose as heretofore described in connection with the roll 10. Accordingly, the parts of the roll 10a illustrated in Figure 6 bear reference characters corresponding to the reference characters of the parts of the roll 10 as illustrated in this figure.

Various other modifications and changes are contemplated and may obviously be resorted to, without departing from the spirit or scope of the invention as hereinafter defined by the appended claims.

I claim as my invention:

1. A husking roll of the character described comprising an elongated core having openings in opposite sides thereof extending to adjacent the ends of said core, a divider constituting a part of said core and interposed between the openings of the core sides, a cylinder mounted on said core and having perforations, said cylinder being journaled directly on the core substantially from end-to-end of the cylinder, means connected to the cylinder for revolving the cylinder on the core for intermittently moving different ones of the perforations into registration with each of the two open sides of said core, means connected to the husking roll beyond one end of the cylinder and opening into one side of the core for supplying air under pressure to said side of the core for discharge through the opening of said side and through the perforations of the cylinder in registration with said opening, and suction means connected to the husking roll beyond an end of the cylinder and communicating with the opposite side of said core for drawing air into the core through the core opening of said last mentioned side and through the cylinder perforations in registration therewith, said core including a disk constituting a rear end thereof and an elongated tapered portion constituting the forward end of the core, said core including elongated cylinder segments extending between and merging at their ends with said core ends and disposed in circumferentially spaced relationship to one another to form said core openings, and said divider comprising a plate extending longitudinally between and connected to said core ends and having longitudinal edges connected to inner sides of said cylinder segments.

2. A husking roll as in claim 1, said cylinder having a tapered end turnably engaging the tapered forward end of said core, and said cylinder segments including converging forward end portions merging with said tapered forward core end and around which a part of the tapered forward end of the cylinder is rotatably disposed.

3. A husking roll as in claim 2, said core ends having bores extending therethrough axially of the roll and opening between said cylinder segments on opposite sides of the divider.

4. A husking roll as in claim 3, said rear core end including a hollow outwardly extending axial stem having a bore forming a part of the bore thereof and in which said suction means is disposed, a sleeve turnably mounted on an inner or forward part of said hollow stem and having an enlargement at its inner end forming a hub detachably connected to the rear end of said cylinder, and said first mentioned means being connected to said sleeve for revolving the sleeve and cylinder relatively to the core.

5. A husking roll as in claim 4, and a hard rubber casing disposed around and secured to said cylinder and having openings registering with the perforations of the cylinder, said casing having a spirally ribbed tapered forward end disposed around the forward end of said core.

6. A husking roll as in claim 5, said hollow stem having a portion disposed beyond the rear end of said sleeve, means engaging said exposed stem portion for supporting the rear end of the core, and said air pressure supply means including a rigid pipe having a rearwardly extending discharge end extending into the tapered forward end of the core for supporting the forward end of said husking roll.

References Cited in the file of this patent
UNITED STATES PATENTS

| | | |
|---|---|---|
| 858,371 | Corley | July 2, 1907 |
| 1,447,328 | Rycroft | Mar. 6, 1923 |
| 2,274,548 | Johnson et al. | Feb. 24, 1942 |
| 2,337,702 | White | Dec. 28, 1943 |
| 2,689,441 | Rosenthal | Sept. 21, 1954 |